No. 783,156. PATENTED FEB. 21, 1905.
F. R. TAISEY.
VOTING MACHINE.
APPLICATION FILED OCT. 12, 1903.
8 SHEETS—SHEET 1.
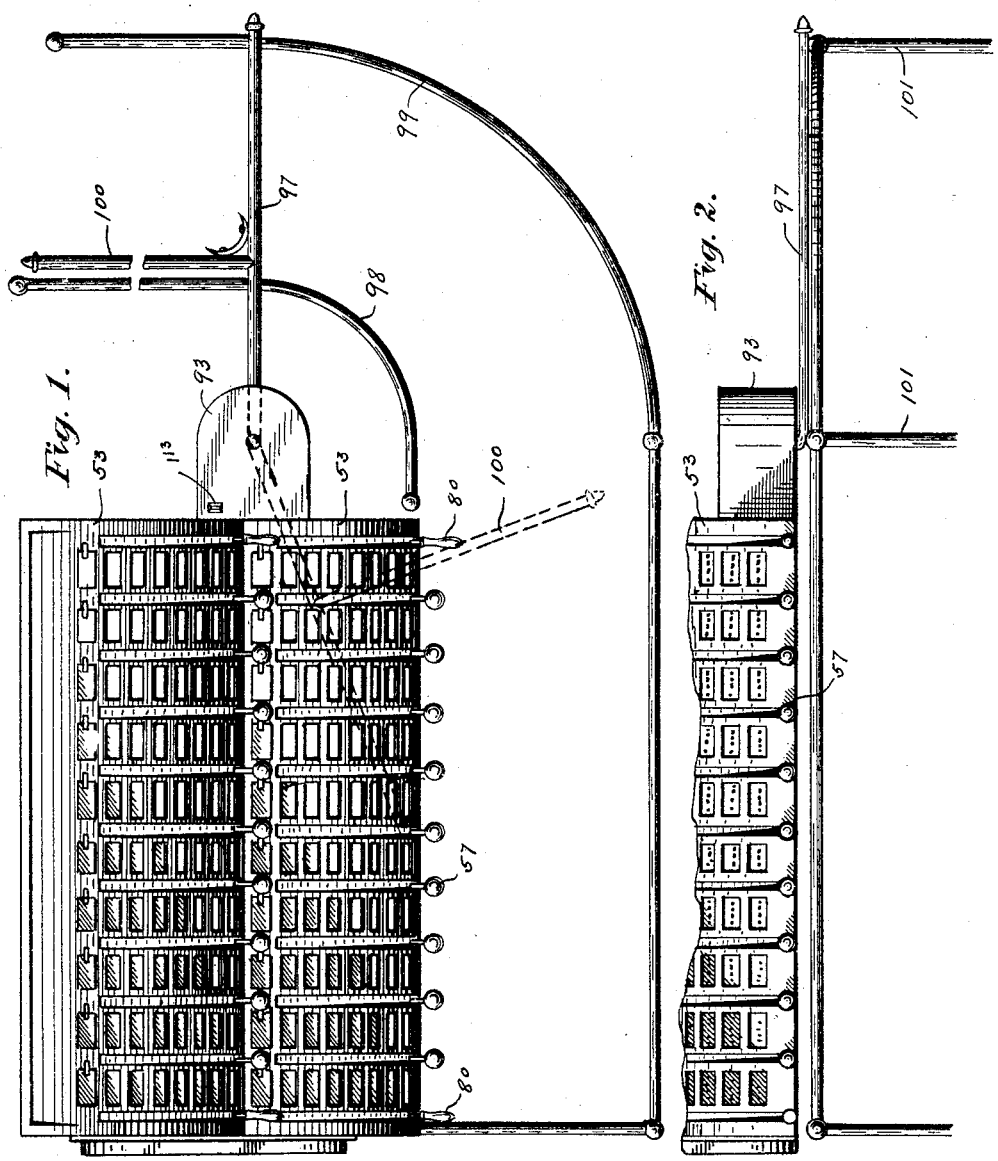

No. 783,156. PATENTED FEB. 21, 1905.
F. R. TAISEY.
VOTING MACHINE.
APPLICATION FILED OCT. 12, 1903.
8 SHEETS—SHEET 2.
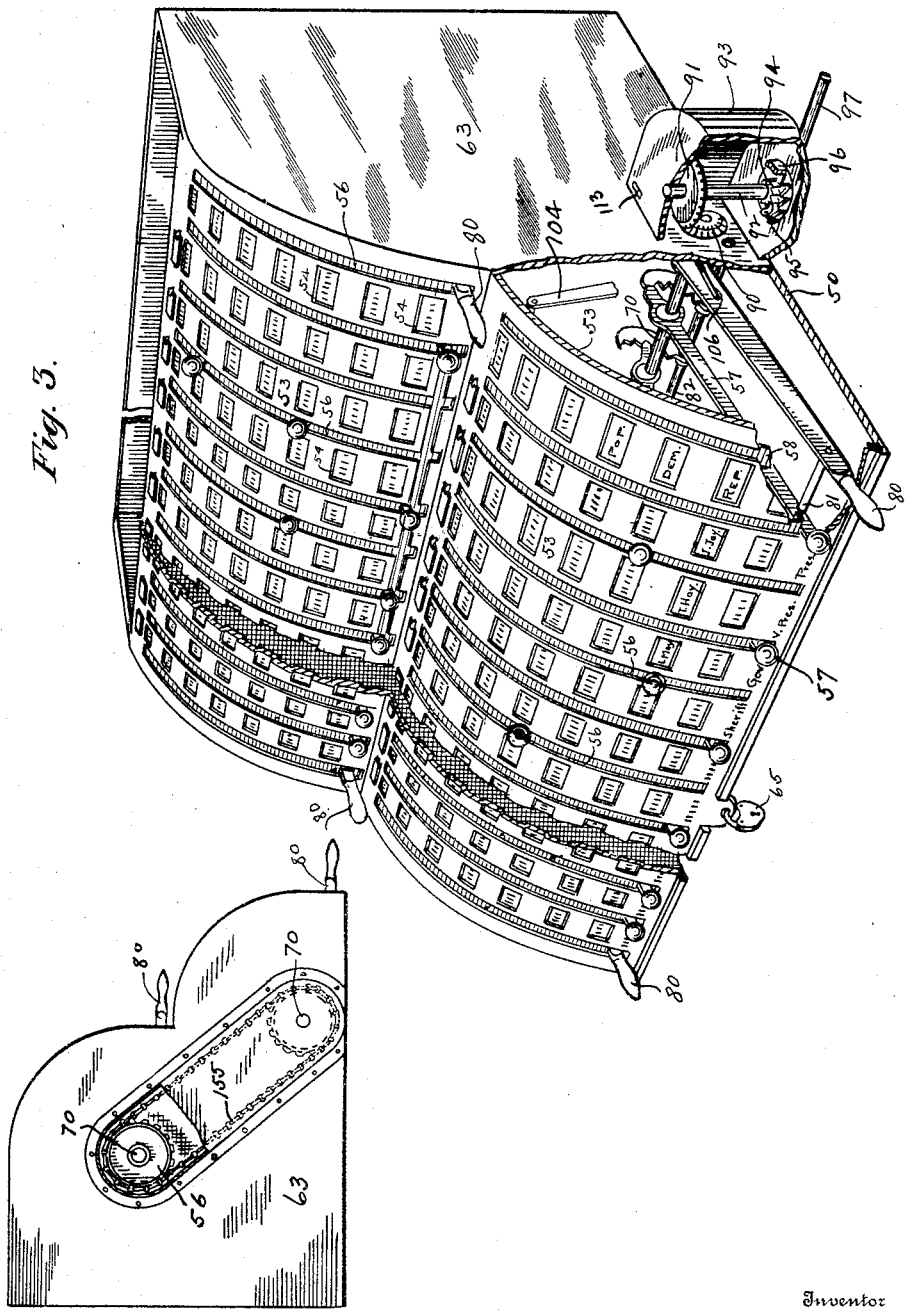
Witnesses
R. P. King.
Nellie Allenory.
Inventor
Fred R. Taisey
By V. H. Lockwood
His Attorney

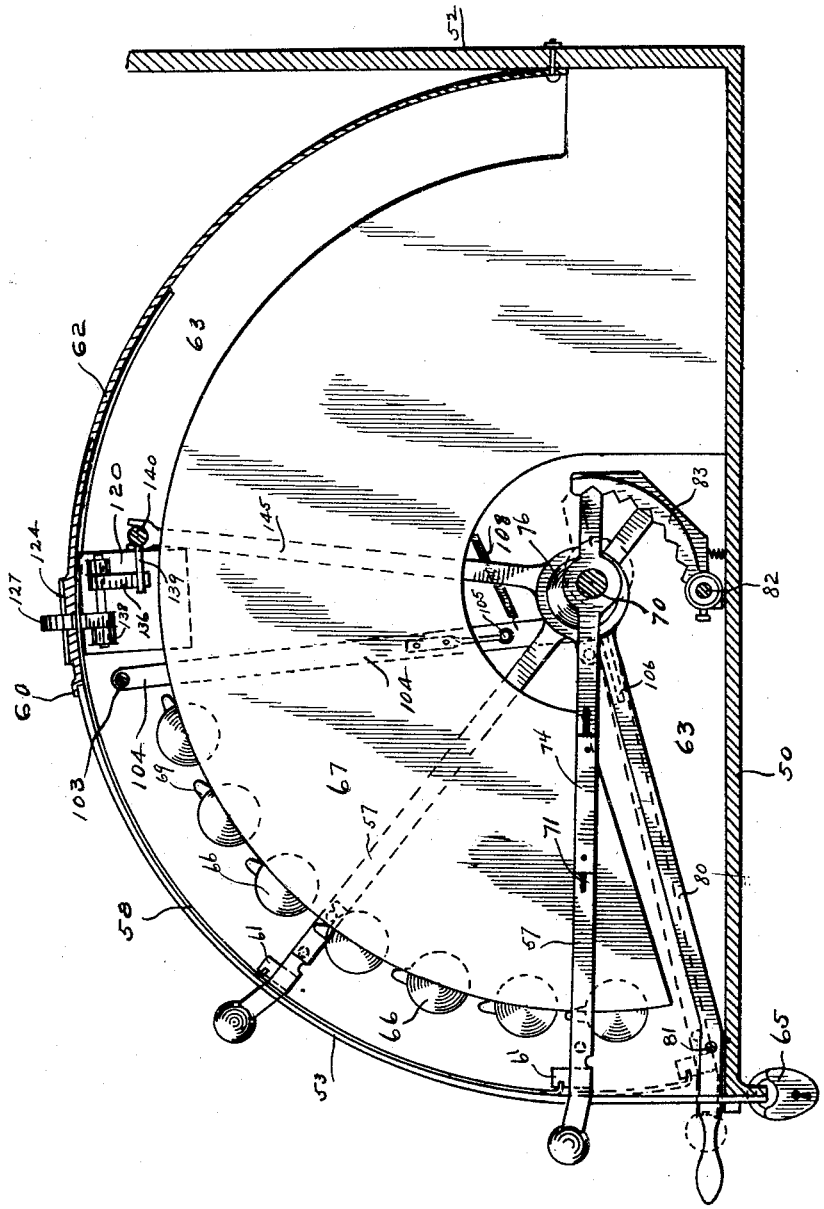

No. 783,156. PATENTED FEB. 21, 1905.
F. R. TAISEY.
VOTING MACHINE.
APPLICATION FILED OCT. 12, 1903.
8 SHEETS—SHEET 4.
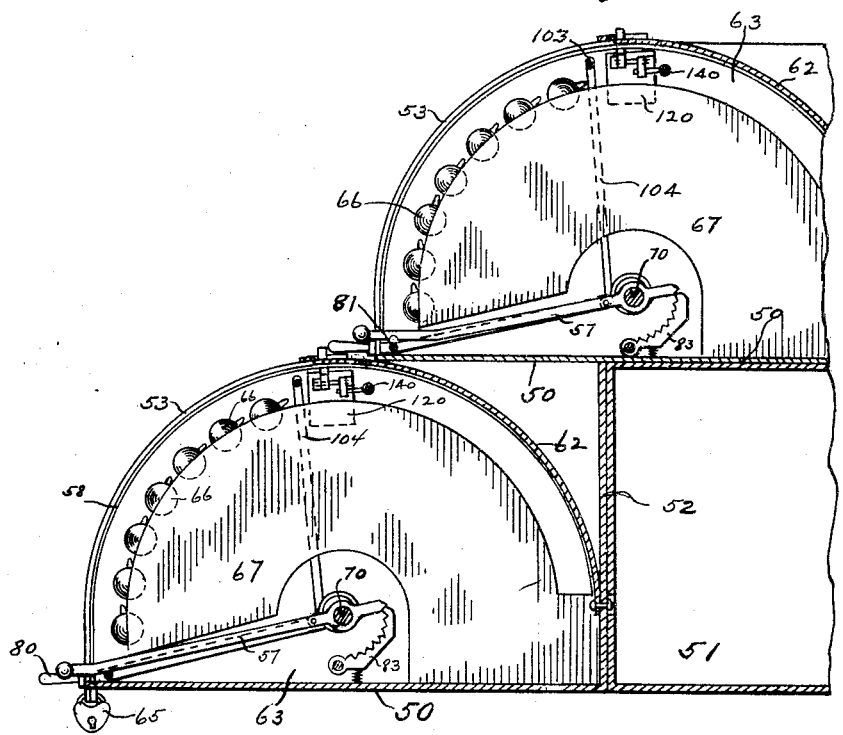
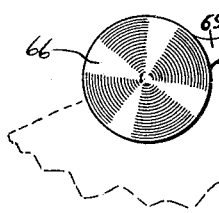
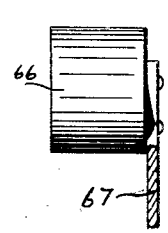
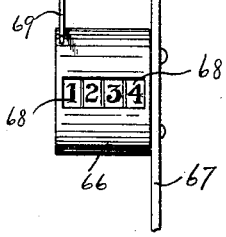
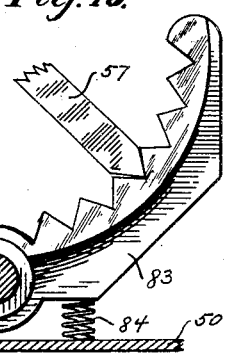
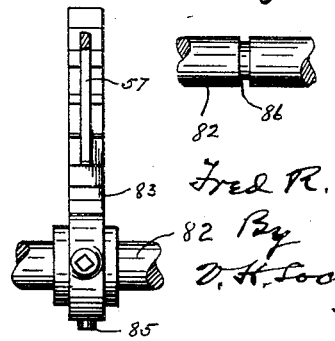
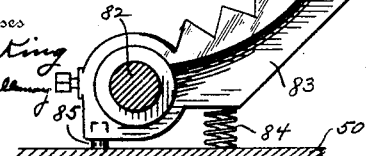

No. 783,156. PATENTED FEB. 21, 1905.
F. R. TAISEY.
VOTING MACHINE.
APPLICATION FILED OCT. 12, 1903.
8 SHEETS—SHEET 5.
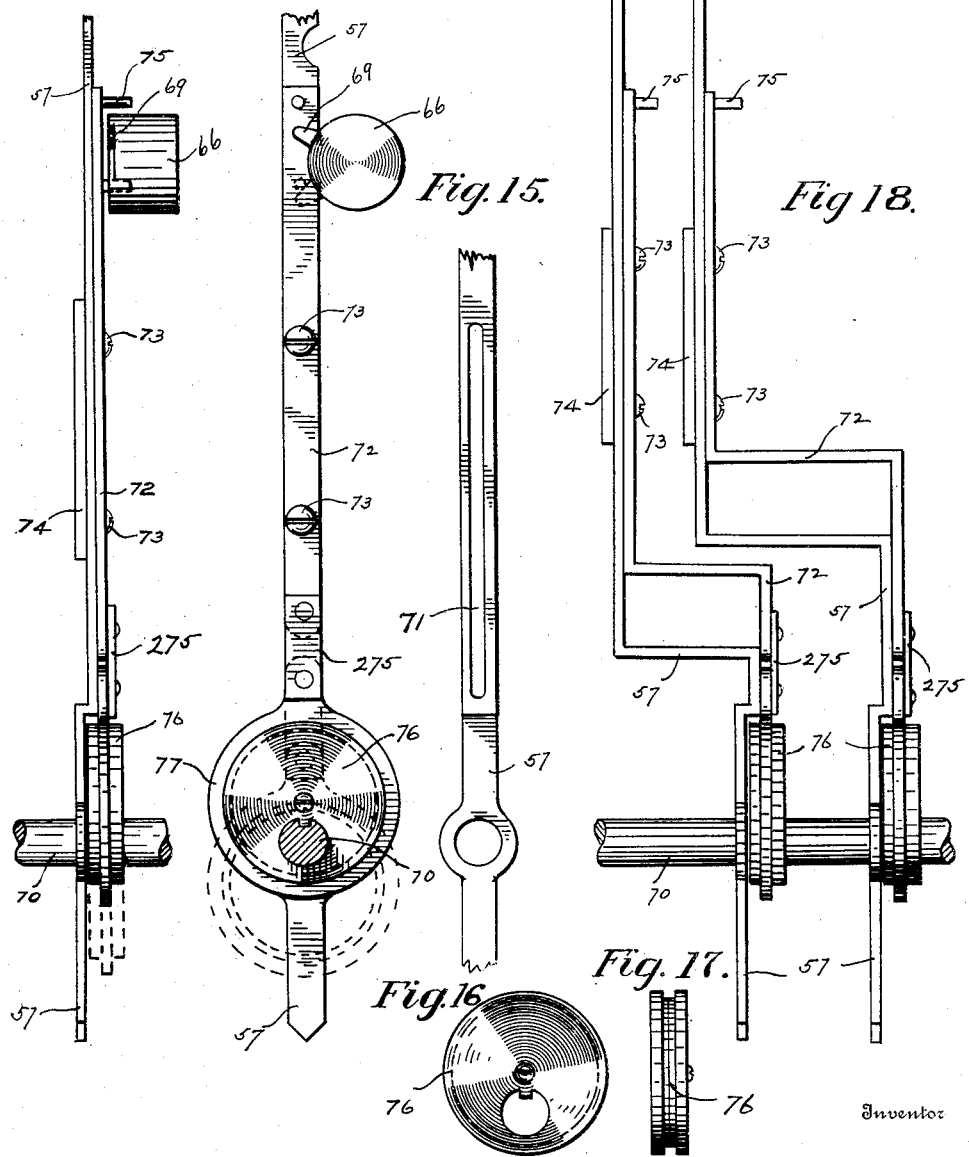

No. 783,156. PATENTED FEB. 21, 1905.
F. R. TAISEY.
VOTING MACHINE.
APPLICATION FILED OCT. 12, 1903.
8 SHEETS—SHEET 6.
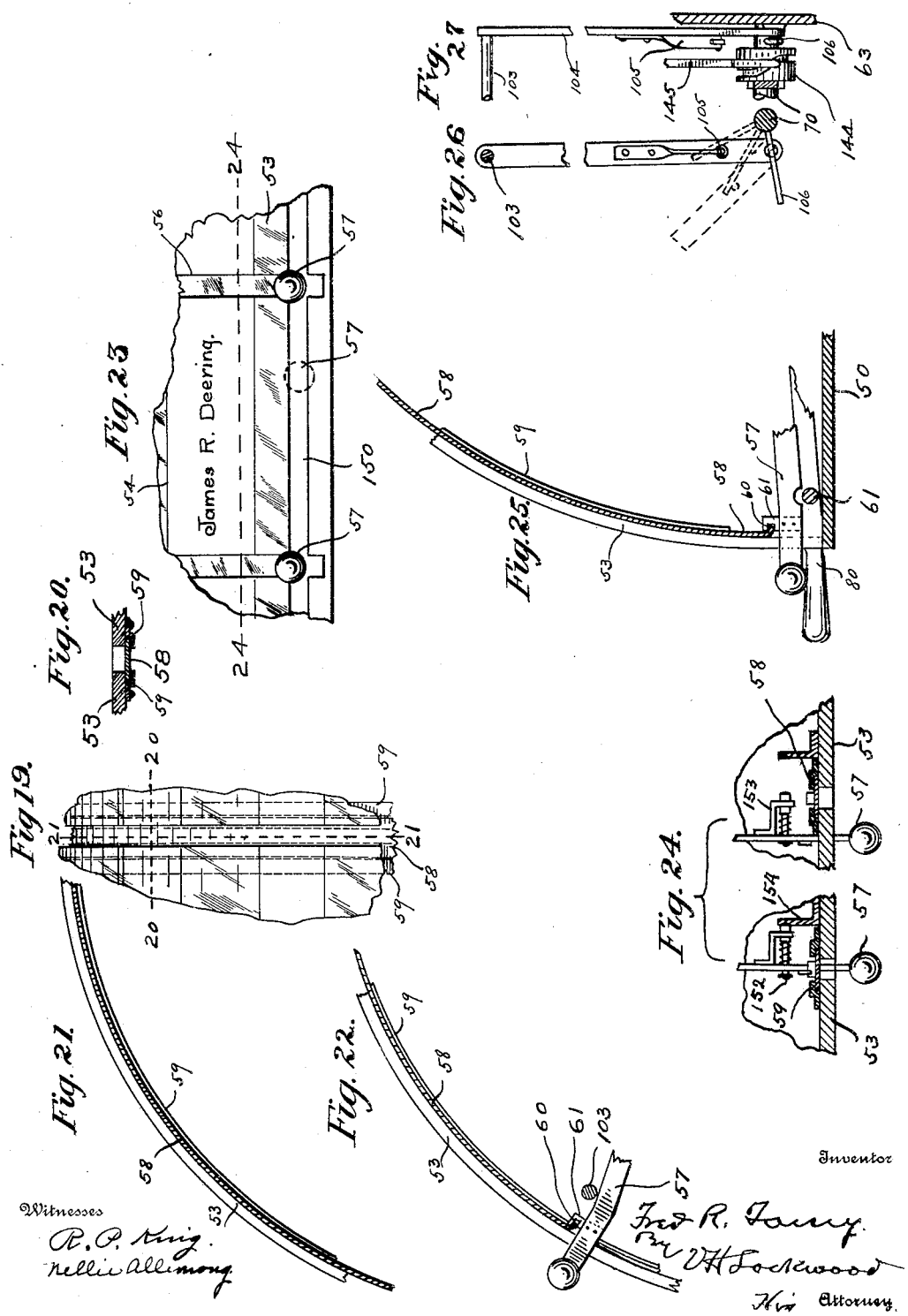

No. 783,156. PATENTED FEB. 21, 1905.
F. R. TAISEY.
VOTING MACHINE.
APPLICATION FILED OCT. 12, 1903.
8 SHEETS—SHEET 7.
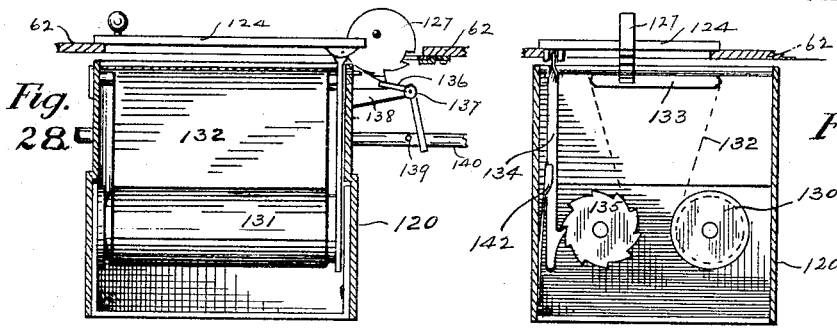
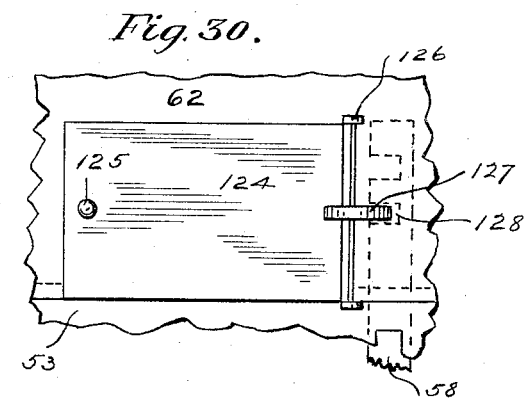
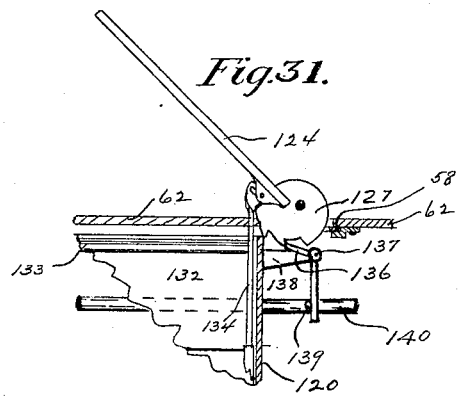
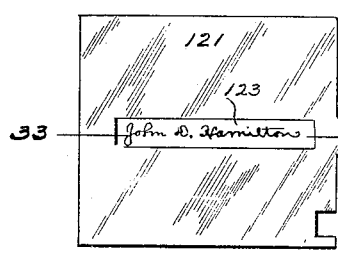
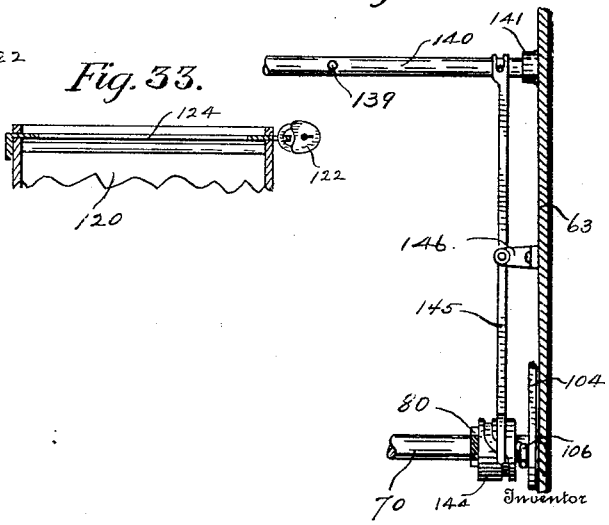

No. 783,156. PATENTED FEB. 21, 1905.
F. R. TAISEY.
VOTING MACHINE.
APPLICATION FILED OCT. 12, 1903.
8 SHEETS—SHEET 8.
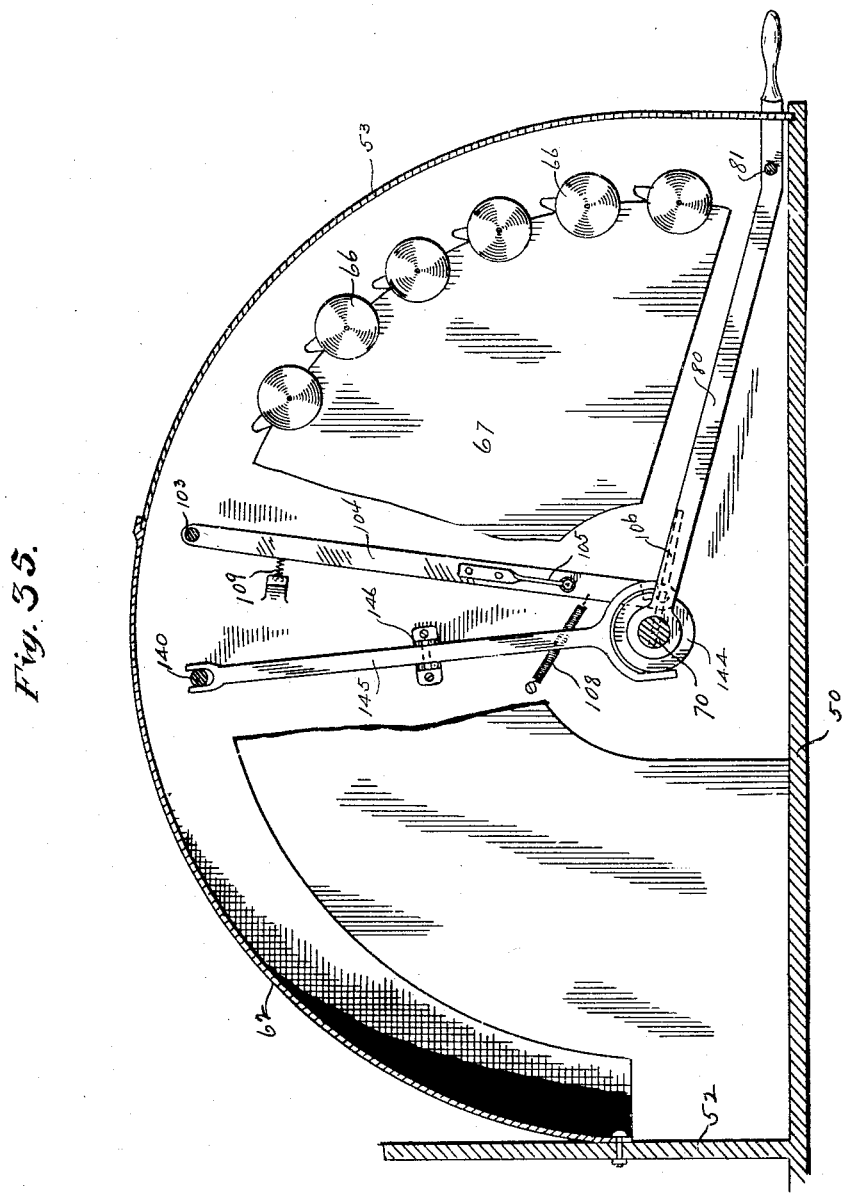

No. 783,156. Patented February 21, 1905.

UNITED STATES PATENT OFFICE.

FRED R. TAISEY, OF INDIANAPOLIS, INDIANA.

VOTING-MACHINE.

SPECIFICATION forming part of Letters Patent No. 783,156, dated February 21, 1905.

Application filed October 12, 1903. Serial No. 176,591.

*To all whom it may concern:*

Be it known that I, FRED R. TAISEY, of Indianapolis, county of Marion, and State of Indiana, have invented a certain new and useful Voting-Machine; and I do hereby declare that the following is a full, clear, and exact description thereof, reference being had to the accompanying drawings, in which like letters refer to like parts.

The object of this invention is to simplify the construction and operation of voting-machines and yet meet the many requirements imposed by the statutes of the various States. This machine belongs to that type of voting-machines wherein the voter does not actuate the registers until he is leaving the voting-machine, but while he is in front of the machine he merely moves voting keys or levers into positions to actuate the registers for the candidates for whom he desires to vote. Means movable by him while leaving the machine causes all of the voting keys or levers so positioned to actuate the corresponding registers. This machine also belongs to that type of voting-machines wherein the registers are stationary and the voter moves the means for actuating the registers into actuating position adjacent said registers. A distinctive feature of this construction consists in providing a single voting key or lever for all the straight tickets and a single key or lever for all the regular candidates for any office. To this end the names and registers of all of the candidates for an office are arranged in a row and a voting key or lever is movable by the voter along said row to a position opposite the name of the desired candidate and his register. The machine, as the voter leaves it, causes the operation of that register. One result of this construction and operation is that no interlocking mechanism is necessary, because there is only one voting key or lever for the candidates for one office, and hence it is impossible to vote for more than one candidate for that office. The straight-ticket-voting means is simplified by the use of a single voting key or lever that in its movement moves all the other voting keys or levers together and in line with it from party-ticket to party-ticket until it reaches the party-ticket for which the voter wishes to cast his vote. It is then left in that position, and the subsequent operation of the machine registers a straight party vote.

By arranging the names and registers of the candidates for the various offices in vertically-curved rows the machine is rendered comparatively compact and small, although I do not wish to limit the direction of movement of the voting-keys. A group-voting mechanism is also provided that is similar to the regular-voting mechanism, excepting that the voting keys or levers are not only movable along one row of candidates or registers, but along every row of candidates or registers forming the group. To this end the vertical slots adjacent the vertical rows of candidates, names and registers are connected by a horizontal slot, so that the voting keys or levers can be so moved as to enable the voter to vote for any candidate or operate any register in the entire group, and in doing so only the same number of voting keys or levers is provided as equals the number of candidates that one is permitted to vote for. Thus if there are seven tickets and seven group candidates on each ticket, making a total group of forty-nine candidates, the machine is provided with only seven voting keys or levers for one to use. Consequently it is impossible for one to vote for more than seven candidates, and no interlocking mechanism is required, and the group-voting mechanism is so constructed as to enable one to vote for a straight ticket as readily as in the regular-voting mechanism.

The machine is also provided with independent-voting mechanism and with interlocking means between the independent and regular voting mechanism.

The full nature of this invention will be understood from the accompanying drawings and the following description and claims.

In the drawings, Figure 1 is a plan view of the voting-machine in position for voting with the guard-rails and gate in place. Fig. 2 is a front elevation of the same with the upper and lower portions broken away. Fig. 3 is a perspective view of the voting-machine, it being centrally broken away and also partially broken away at one end, as shown, the register-holding plates omitted. Fig. 4 is an elevation of the left-hand end of the machine with a portion of the chain-casing broken away. Fig. 5 is a vertical transverse section of the lower section of the machine, showing the voting-levers in different positions in their operation. Fig. 6 is a vertical transverse section of the entire machine near the right-hand end of the machine. Fig. 7 is an end elevation of one of the counters, a portion of the plate on which the counter is mounted being shown in dotted lines. Fig. 8 is a front elevation of the counter with said plates being partly in section and partly broken away. Fig. 9 is a plan view of one of the counters and the means on which it is mounted, the latter being partly broken away. Fig. 10 is a side elevation of one of the ratchets for holding the voting-levers in position, the end of one of said levers being shown broken away and the means for mounting the ratchet being in transverse section. Fig. 11 is a front elevation of a part of what is shown in Fig. 10. Fig. 12 is a plan view of a portion of the rod on which the ratchet is mounted and showing the groove for mounting said ratchet. Fig. 13 is a front elevation of one of the voting-levers partially broken away and the shaft on which it is mounted also broken away and a counter. Fig. 14 is an elevation of the left-hand side of what is shown in Fig. 13, the shaft being shown in transverse section. Fig. 15 is a side elevation of a portion of the voting-lever, the ends being broken away. Fig. 16 is a side elevation of an eccentric that is combined with the voting-lever. Fig. 17 is a plan view of the same. Fig. 18 is an elevation of a pair of voting-levers and attached parts for group voting, the outer end of the levers and the shaft upon which they are mounted being broken away. Fig. 19 is a front elevation of a portion of the casing of the machine, parts being broken away and parts being shown in dotted lines. Fig. 20 is a transverse section on the line 20 20 of Fig. 19. Fig. 21 is a vertical section of what is shown in Fig. 19 on the line 21 21. Fig. 22 shows the arrangement of the casing on the same line as in Fig. 21, but in the group-voting mechanism, and also the side elevation of one end of the voting-lever and the resetting-bar in transverse section. Fig. 23 is a front elevation of a portion of the machine to illustrate the group voting, showing the lower part of the casing and the knobs of two voting-levers, parts being on enlarged scale and partly broken away, and one voting lever or knob shown in dotted lines in the position while being operated. Fig. 24 is a plan view on the line 24 24 of Fig. 23 with the casing removed and parts being broken away, one of the voting-levers being operated in group voting. Fig. 25 is a section similar to what is shown in Fig. 21 and extending down to the bottom of the machine and showing one voting-lever and the straight-ticket bar in side elevation, parts being broken away. Fig. 26 is an inside elevation of an end bar for supporting the resetting-bar, said end bar being centrally broken away, and the means for operating said end bar, the resetting-bar, and the shaft being in transverse section and the changed position of the parts being shown in dotted lines. Fig. 27 is a rear elevation of what is shown in Fig. 20 with details added and part of the casing in section. Fig. 28 is a vertical section of the independent register and of a portion of the casing of the machine, parts being broken away, the section being in front of the rolls within the register-casing. Fig. 29 is vertical transverse section at the outside end of the rolls with the end of the casing removed. Fig. 30 is a plan view of the same, part of the casing of the machine being broken away and the register being shown closed. Fig. 31 is the upper right-hand part of what is shown in Fig. 28 with the lid open. Fig. 32 is a plan view of the inside of the independent register. Fig. 33 is a vertical section of the upper part of the independent register on the line 33 33 of Fig. 32, parts removed and parts broken away. Fig. 34 is a front elevation of the means for resetting the independent registers, parts being broken away and parts in section. Fig. 35 is a vertical section of a single section of the machine near the left-hand end.

In the drawings herein produced to illustrate the general nature of my invention I have shown, as is apparent in Figs. 1 and 3, a double machine, an upper and a lower part. The upper part is for group voting where that is necessary, and when it is not necessary the upper machine may be removed, leaving only the lower or main machine. The machine-casing is formed in the first place of a base 50, upon the rear portion of which there is placed a frame 51, which has no function excepting to assist in supporting the upper voting-machine. The casing of each part of the main voting-machine has a back plate 52. As appears in Fig. 5, the curved face-plate 53 of the machine is removable, the upper end being caught under a lip 60 on the stationary top plate 62. The top plate 62 is curved transversely and secured to the back plate 52 and to the end boards 63. The front plate 53 is likewise curved in the arc of a circle transversely and covers the front part of the machine, it acting in conjunction with the plate 62 to cover the machine. Said front plate is removable, its upper edge fitting under a lip 64 from the front edge of the plate 62, and its lower edge being locked to the front edge of the base 50 by a lock 65. Said front plate 53 is made of a single plate of metal and carries on its surface a series of brackets 54 to receive a ticket for each candidate for an office, the names of all candidates for each party ticket being placed in a horizontal row on said plate, as appears in Fig. 3. The candidates for each office are arranged in a vertical rearwardly-extending row, as there shown. Beside the row of candidates for each office the plate 53 is provided with a slot 56, through which the voting-lever 57 is moved in the operation of voting.

Under each slot there is a sliding curved plate 58, as shown in Fig. 19, that moves in the guideway formed by the guiding-plates 59 on each side of said slot secured to the under surface of the main face-plate 53 of the machine. Said sliding plates 58 have the lower ends turned inward to engage a notch 60 in the bracket 61, secured to the side of the voting-lever 57, as shown in Figs. 22 and 25, whereby said sliding plate is connected with said lever so that the plate moves as the lever moves and closes the opening into the machine through the main plate 53 when the lever is drawn down into its unoperated position.

As appears in Fig. 3, there are a number of vertical slots, one for the candidates for each office, through which the voting-lever 57 is moved. The names of the candidates for each ticket are arranged in a horizontal row, the name of the ticket coming first at the right and the names of the candidates on said ticket continuing horizontally to the left.

In voting the lever 57 is elevated and in such elevation operates one of the registers 66, to be seen in Fig. 5. There is a register 66 behind or under the name of each candidate, so that the vertical row of registers will be immediately to the right of the path of movement of the voting-lever 57 that actuates them. Said registers 66 are mounted at the side on the periphery of the curved plate or partition 67, as seen in Figs. 6, 8, and 9. Each register 66 consists of a casing with suitable counters or indicating-wheels 68 and a lever or a counter-actuating arm 69. There is nothing peculiar regarding the construction of the registers, and I do not wish to be limited to the use of the registers herein shown, as any sort of register may be used, provided they have an actuating means, like the arm 69, so placed as to be operated by some means on the lever 57.

The voting-levers 57 have a long main bar mounted on the shaft 70, that extends horizontally through each section or portion of the machine, so that said levers will oscillate on said shaft, as appears in Figs. 13 to 18. Each of them has a knob on the outer end whereby it may be moved by hand, and said main long bar has a longitudinal slot 71, as seen in Fig. 15. Means for operating the register is slidably mounted on said main bar of each of said voting-levers. It consists of a bar 72, provided with a pair of screws 73, that extend through the slot 71 into a short plate 74. Said sliding bars 72 have on their outer ends a horizontally-extending pin 75, that is adapted when said bars 72 are drawn inward toward the shaft 70 to engage the actuating-arm 69 of the register and move it from the full-line position shown in Fig. 14, to the dotted-line position. This actuates the register one notch or number.

In operating the voting-machine the voting-levers 57 are first moved into a position to cause the actuation of the desired registers— that is, in the position shown in Figs. 13 and 14 by full lines. After the voting-levers are placed in position by the voter and while he is leaving the machine the shaft 70 is actuated by means to be explained hereinafter, which will cause all of the cams 76 that are mounted on said shaft 70 to be turned from the full-line position shown in Figs. 13 and 14 to the dotted-line position and back to the original normal position. Each of the sliding bars 72 is pivotally connected by a link 275 to a ring 77, that loosely surrounds the cam 76, said ring 77 fitting in the peripheral groove seen in Fig. 17. The inward movement of the bar 72, caused by the rotation of the shaft 70, will cause the pin 75 to engage the arm 69 of the register and operate the same. (See Fig. 14.)

Since there is only one voting-lever for each office, there is no chance for a voter to vote for more than one candidate for the same office. He can only position one lever opposite the name of one candidate and leave it there when he leaves the machine. A subsequent operation of the shaft 70 will cause the actuation of a register for that one candidate. Hence this machine avoids the complex interlocking mechanism required in other types of machines and which makes such other machines so complicated.

If one desires to vote a straight ticket, he operates one of the straight-ticket bars 80 by moving it upward opposite the name of the party for which he wishes to vote. From said straight-ticket lever there is a rod 81 running under all the voting-levers 57, so that movement of the straight-ticket lever will move all the voting-levers 57. In a long machine I provide a straight-ticket lever 80 at each end, as shown in Fig. 3, and the rod 81 extends from one to the other, so that the voter uses both hands in voting a straight ticket. When he has operated the straight-ticket levers 80, they drop back as soon as he releases them. This places all the individual-voting levers in line with all the names of the candidates on a ticket, so that the subsequent operation of the shaft 70 will cause one to be added to the vote of every candidate on such ticket.

After the individual-voting levers have been moved to the voting position they are held there until the voter leaves the machine and operates the shaft 70 by means of the rack or ratchet shown in Figs. 10 and 12. A rod 82 extends across the machine and is at each end mounted in the end plates 63. It carries a series of ratchet-arms 83, loosely mounted on it and each supported by the spring 84, that rests on the bottom 50 of the casing. The spring tends to push the ratchet 83 up against the end of the voting-lever 57. The upward movement of said ratchet-arm is limited by the stop-pin 85, that acts against the bottom 50 of the casing. The spring 84 is weak enough to permit the free movement of the lever 57, but strong enough to hold said lever in any position in which it is moved. There is one of these ratchet-arms 83 for each lever 57. The ratchet-arms 83 are prevented from lateral movement by the groove 86 in the rod 82.

The main shaft 70 is actuated by the means shown in Fig. 3. Said shaft has on its outer end a bevel-pinion 90, that meshes with the bevel-gear 91 on the vertical shaft 92, mounted in the casing 93, attached to the right-hand end of the machine, as seen in Figs. 1 to 3. The shaft 92 is actuated by the ratchet-wheel 94, that is secured on it. The ratchet-wheel in turn is actuated by a spring-pawl 95, mounted on the disk 96, to the bottom of which gate-lever 97 is secured. The gate-lever 97 extends across a parallel pair of guard-rails 98 and 99 on the vertical posts 101, through which the voter passes in approaching the machine. It is thus clear that in approaching the machine his body will force the gate-lever 97 inward from the full-line position shown in Fig. 1 to the dotted-line position. Said gate-lever has on it an arm 100, that extends behind the voter as he enters, so that after he has voted and leaves the machine his body will move the arm 100, and therefore the gate-lever 97, backward from the dotted-line position shown in Fig. 1 to the full-line position. This outward or return movement of the gate-lever will, through the disk 96 and pawl 95, actuate the ratchet 94, shaft 92, and other mechanism for operating the main shaft 70.

After the voter has taken a position in front of the machine and has placed the voting-levers in position to actuate the desired registers as he leaves the voting-machine the shaft 70 is operated, as just explained, and it rotates the cams 76, which draw inward all the bars 72, which causes them to actuate the proper registers. The gearing of the mechanism for driving the shaft 70, which has been described, is so arranged that said shaft will make one complete revolution while the gate-bar 97 is moved from the dotted-line position shown in Fig. 1 to the full-line position.

I have now described the means employed in ordinary voting, and the rotation of the shaft 70 not only causes the actuation of the registers, but also the resetting of the voting-levers. They are reset by the transverse rod 103, extending across the machine and supported at each end of the machine by an arm 104, that is pivoted to the inner surface of the end plate of the machine and in such position as to enable the rod 103 to be moved in a line concentric with the cover 53 of the machine. The downward sweep of said rod 103 from the position shown in Fig. 5 will obviously return all the voting-levers to their downward and unoperated position, and said levers will be held in their downward position by the outer or free end of the ratchet 83 engaging the under surface of the end of the levers 57, as seen in Fig. 1. Said resetting-rod 103 is caused to oscillate during the revolution of the main shaft 70 by the pins 106, which are secured to said shaft, coming into engagement with spring-held rollers 105, extending inward from the bars 104. The bars 104 are pivoted at points in front of the shaft 70, and the pins 106 are of such length that in their revolution their ends will escape the spring-held rollers 105 when they have forced the bars 104 down to a point below the horizontal position. Said pins 106 are also so rotated on the shaft that they will actuate the resetting means in the latter part of the movement of the shaft and after the registers have been actuated. The springs 108 return the resetting-rod and are stopped by the spring-buffer 109.

The means for casting independent votes will now be explained. A series of independent recorders are provided, one for each office. They are secured on the upper part of the stationary cover 62, as appears in Fig. 5, one immediately to the left of each of the sliding plates 58, as appears in Fig. 30, where said plates are shown in dotted lines. The independent recorders are shown in Figs. 28 et seq., and consist of the casing 120, the top of which is secured to the under surface of the cover 62. This casing 120 has a movable top plate 121, that is fastened in place by a lock 122 and is provided with a slot 123. The main stationary cover 62 has an opening in it over each independent recorder, as seen in Fig. 29, that is nearly as large as the lid 124, that covers said opening. Said lid has a knob 125 for opening it, and it is hinged at 126 to the stationary cover 62. At its hinged end it has secured to it a cam-disk 127, that operates through a suitable slot in the cover 62 to engage the notch 128 in the curved sliding plate 58, as shown in Fig. 30. When the cam 127 engages said notch 128, the lid 124 can be opened. Said notch is so placed in the plate 58, however, that it registers with said cam 127 only when the voting-lever connected with the sliding plate 58 is at its lowest unoperated position. Therefore when the voting-lever has been operated, and thereby the plate 58 operated, so that the notch 128 will not register with the cam 127, it is clear that the independent-voting mechanism cannot be operated. This constitutes the interlocking means between the independent-voting means and the regular-voting means.

Within the casing 120, as appears in Fig. 5, there are mounted two rolls 130 and 131 for a sheet of paper 132. This sheet is first on the roll 130 and therefrom passes over the transverse plate 133, secured to the ends of the casing 120, and thence the sheet passes to the roll 131, upon which it is wound in the process of voting. The name of the independent candidate voted for is written on the sheet 132 through the opening 133 in the plate 121, as seen in Fig. 32, after the lid 124 has been elevated to the position shown in Fig. 31. The roll is fed by the opening of the lid 124 at the time the voter desires to vote for an independent candidate by reason of the pawl 134, which is pivoted at its upper end to said lid 124, engaging the ratchet-wheel 135, connected with the roller 131. This is seen in Figs. 29 and 31, and it will appear therefrom that as the lid 124 is elevated the paper will be fed to the extent of one notch of the ratchet-wheel 135.

The voter is prevented from voting for more than one independent candidate by the following means: The cam 127 is notched on the under side, as shown in Figs. 28 and 31, and after he has opened the lid 124, as seen in Fig. 31, it will be held open by the notch in the cam 127 engaging the bell-crank-shaped trip 136, mounted at 137 on the arm 138 from the casing 120. This trip 136 is engaged by a pin 139 on the rod 140, that extends entirely across the machine adjacent and behind the series of independent recorders. This rod appears in Fig. 34 in front elevation and in transverse section in Fig. 35. It is mounted at each end slidable in a cup-shaped thimble 141 on the inner surface of the end plates 63. It is therefore seen that after the voter has lifted the lid 124 he cannot record another independent vote for the same office before he leaves the machine. As he leaves the machine the independent-voting mechanism is reset by the longitudinal movement of the rod 140, whereby the pins 139 will move the lower arms of the trips 136 all to the right, as compared with the position shown in Fig. 31, whereby all of said trips release all the lids 124. The downward movement of the pawl 134 on the lid 124 escapes the ratchet-wheel 135. In its upward movement it is pressed toward the ratchet-wheel by a spring 142. The longitudinal movement of the rod 140 is caused by a cam-groove in the cylinder 144, secured on the shaft 70, into which inwardly-extending pins extend from the yoke-shaped end of the lever 145, which is fulcrumed to an arm 146, that extends inward from the end plate 63 of the machine. The paper in the independent-voting recorders is inserted through the bottom of the case 120, which is open. It is thus seen that with this arrangement of the independent-voting mechanism an independent vote cannot be cast for any regular candidate who has been voted for for the same office, as after a voting-lever has been operated and moves the curved plate 58 the cam 127 cannot enter the notch 128. Likewise when an independent candidate has been voted for it is impossible to vote for a regular candidate, because the cam 127 is in the slot 128 and locks the curved plate 58 from any movement, so the voting-lever cannot be moved.

Referring now to the group-voting mechanism, I place what may be termed a "second" voting-machine or section of the voting-machine to the rear and on a higher level than the main portion, which I have been heretofore describing. It is the same as what has been described in all respects, excepting a slight change in the voting-levers, as shown in Fig. 18, and a slight lengthening of the curved plate 58, so that the notch 128 therein will not register with the cam 127, but be slightly to the rear of the same, and excepting a horizontal slot 150, which connects the upwardly-extending peripheral slots in the cover 53 at their lower ends, as seen in the central portion of Fig. 3. Said upwardly-extending slots have likewise an extension 151 slightly below the horizontal slot 150. The purpose of this horizontal slot is to permit the voting-levers to be moved laterally into any of the vertical slots desired. The voting-levers shown in Fig. 18 for use in group-voting are laterally slidable on the shaft 70. They are constructed in exactly the same way as the ordinary voting-levers, excepting that they are offset gradually, as shown in Fig. 18—that is, the offset in the series of group-voting levers is increased in length successively. As seen in Fig. 3, there are seven slots in the upper right-hand portion of the machine that are connected by the horizontal slot 150 and that constitute the group-voting part of the machine therein shown. It is adapted to vote for at least seven candidates for an office. The candidates on the various tickets are arranged in horizontal rows, the same as on the other part of the machine.

There are in the group-voting part of the machine shown seven voting-levers, which may be placed opposite the names of seven candidates, and registers accompanying the same, and as the voter leaves the machine said registers will be actuated in the manner heretofore explained. With the horizontal slot 150 these voting-levers may be moved to any desired vertical slot. If there should be seven party tickets, and therefore seven candidates, arranged beside one vertical slot, all seven of the voting-levers could be moved laterally and up into the single vertical slot and successively opposite the names of the candidates adjacent thereto; but if the voter should desire to scatter his vote the voting-levers can be placed at various places in the various slots, as shown. Since there are only seven voting-levers, he can only vote for seven candidates, so that no interlocking means is necessary to restrict his vote. As each voting-lever is moved into its desired position, it is held there by a spring-pressed pin 152, mounted on each lever in a bracket 153, that engages recesses in a plate 154, secured to the cover, as shown in Fig. 24.

In the group-voting mechanism the independent recorders are located in the same position as in the regular-voting mechanism; but the notches 128 in the sliding plates 58 are placed somewhat farther to the rear as compared with the same notches in the same plates in the regular-voting mechanism. This is so that before one can vote for an independent candidate in group voting he must bear down on one of the voting-levers to move the sliding plate 58 adjacent the independent recorder desired to be operated, so that the voting-lever will enter the recess or notch 151 and the sliding plate be drawn down farther than normally in order to bring the notch 128 into alinement with the cam 127. Then it will be possible for one to vote for an independent candidate and impossible for him to vote one of the voting-levers. He can still operate one of the other six levers to vote for the six other candidates or he can vote for some of the other independent candidates; but every time he operates an independent recorder he is compelled to lock one of the voting-levers in the manner specified. This prevents him from voting for more than the legal number of candidates when he desires to vote for an independent candidate while group voting.

It may be added that behind the voting-levers in the group-voting mechanism the ratchets 83 are omitted, as said ratchets might interfere with the horizontal movement of the voting-levers, and means such as has been described is provided for holding the voting-levers in place.

The group-voting mechanism is reset through the operation of the main shaft 70 in the main portion of the voting-machine acting through the sprocket-chain 155 on the sprocket-wheel 156 to operate the shaft 70 in the upper part of the machine, as shown in Fig. 4. With the foregoing difference the resetting mechanism for the group-voting part of the machine is the same as for the regular part of the machine. The operation of the sprocket-chain 155 not only causes the resetting of the group-voting mechanism, but immediately prior to the resetting it causes the operation of the registers therein in the same order and in the same way as in the regular part of the machine. It is obvious that the group-voting part of the machine is simplified from the fact that in the form herein shown only seven voting-levers are needed to vote for any of forty-nine candidates.

What I claim as my invention, and desire to secure by Letters Patent, is—

1. In a voting-machine, a series of registers relatively stationary and mounted in curved rows concentric to each other, a rod or shaft concentric with the series of registers, and voting-levers fulcrumed on said rod or shaft that are movable along the series of registers for actuating the desired register.

2. In a voting-machine, a curved face-plate with radial slots in it and adapted to receive the names of candidates and tickets thereon, a rod or shaft concentric with said face-plate, voting-levers fulcrumed on said rod or shaft and movable through said slots, and registering mechanisms relatively stationary and mounted within the machine so as to register with said slots and be engaged by said voting-levers.

3. In a voting-machine, plates within the machine, registers relatively stationary and mounted on the periphery of said plates in curved rows, a rod or shaft in the machine concentric with the curved rows of registers, and voting-levers fulcrumed on said rod or shaft, one between each pair of register-carrying plates, that are movable into actuating engagement with said registers.

4. In a voting-machine, a slotted face-plate, registers mounted within the machine near said slots, each register having an actuating-arm extending therefrom, voting-levers movable along said slots beside the registers and carrying means for engaging said register-arms, and means for longitudinally moving said voting-levers after they have been placed in position to engage and actuate the desired register.

5. In a voting-machine, registers within the machine arranged in curved rows and having actuating-arms extending therefrom, a shaft in the machine concentric with said rows of registers, voting-levers consisting of a main member or bar fulcrumed on said shaft and a slidable member or bar mounted in connection with said main member or bar and carrying means for engaging and actuating the registers and at their rearward end provided with a ring, and eccentrics mounted on said shaft within the rings upon the movable members of the voting-levers so that when the shaft is actuated the movable members of the voting-levers will be actuated.

6. In a voting-machine, a curved face-plate with radial slots therein, registers within the machine in line with said slots and having actuating-arms extending therefrom, a rod or shaft in the machine concentric with the face-plate, voting-levers consisting of a main member or bar fulcrumed on said rod or shaft and a slidable member or bar mounted in connection with said main member or bar and carrying means for engaging and actuating the registers and at their rearward end provided with a ring, and eccentrics mounted on said rod or shaft within the rings upon the movable members of the voting-levers so that when the shaft is actuated the movable members of the voting-levers will be actuated.

7. In a voting-machine, registers within the machine arranged in rows and having actuating-arms extending therefrom, voting-levers movable along the rows of registers consisting of a main bar and a slidable bar mounted in connection with said main bar and carrying means for engaging and actuating the register, and means for actuating said slidable bar when the voting-lever is moved into position for actuating a register.

8. In a voting-machine, registers within the machine arranged in curved rows with actuating-arms extending therefrom, a shaft concentric with said rows of registers, eccentrics on said shaft, and voting-levers consisting of a main bar fulcrumed on the shaft beside an eccentric and a bar slidably mounted on said main bar with means on its outer end for engaging and actuating a register, a ring mounted on said eccentric, and a link connecting the inner end of said slidable bar with the ring on said eccentric.

9. In a voting-machine, a series of vertically-curved rows of registers with an actuating-arm extending from each register, there being one row of registers for the candidates for each office, a shaft concentric with said rows of registers, a voting-lever for each row of registers mounted on said shaft, and means actuated by said shaft for operating all of said voting-levers.

10. In a voting-machine, registers arranged in a curved row, a rod or shaft mounted concentric with said row of registers, a voting-lever pivoted upon said rod or shaft and movable independently of said shaft along said row of registers for actuating them, and means for holding the voting-lever from oscillation after it has been placed adjacent a register.

11. In a voting-machine, registers arranged in a curved row, a rod or shaft mounted concentric with said row of registers, a voting-lever pivoted upon said rod or shaft so that it is movable along said row of registers for actuating them and extending beyond said rod or shaft at its inner end, and a spring-actuated ratchet-bar that engages the inner end of said voting-lever and holds it in the position to which it is moved.

12. In a voting-machine, registers arranged in a curved row, a rod or shaft mounted concentric with said row of registers, a voting-lever pivoted upon said rod or shaft so that it is movable along said row of registers for actuating them and extending beyond said rod or shaft at its inner end, a ratchet-bar that engages the inner end of said lever for holding the lever in place, means for pivoting said ratchet-bar at one end, and a spring that presses the ratchet-bar against the end of the voting-lever.

13. In a voting-machine, registers arranged in a curved row, a rod or shaft mounted concentric with said row of registers, a voting-lever pivoted upon said rod or shaft so that it is movable along said row of registers for actuating them and extending beyond said rod or shaft at its inner end, a spring-actuated ratchet-bar that engages the inner end of said voting-lever and holds it in the position to which it is moved, and a stop to limit the movement of said ratchet-bar toward the lever.

14. In a voting-machine, registers arranged in a series of vertically-curved rows, there being one row for the candidates for each office, a shaft mounted concentric with said rows of registers, voting-levers mounted upon said shaft so that they are movable along said rows of registers for actuating them and extending beyond said shaft at their inner ends, there being one voting-lever for each row of registers, a rod mounted parallel with said shaft, ratchet-bars mounted on said rod and curved concentric with said shaft and which engage the inner ends of said levers for holding the levers in place, there being one ratchet-bar for each lever, and springs that press the ratchet-bars against the ends of the voting-levers.

15. In a voting-machine, registers within the machine arranged in rows and having actuating-arms extending therefrom, voting-levers movable along the rows of registers consisting of a main bar and a slidable bar mounted in connection with said main bar and carrying means for engaging and actuating the registers, and means operative by the voter as he is leaving the voting-machine for actuating said sliding bar when the voting-lever is moved into position for actuating the register.

16. In a voting-machine, registers within the machine arranged in curved rows and having actuating-arms extending therefrom, a shaft in the machine concentric with said rows of registers, voting-levers consisting of a main member or bar fulcrumed on said shaft and a slidable member or bar mounted in connection with said main member or bar and carrying means for engaging and actuating the registers and at their rearward end provided with a ring, eccentrics mounted on said shaft within the rings upon the movable members of the voting-levers so that when the shaft is actuated the movable members of the voting-levers will be actuated, and means movable by the voter as he is leaving the voting-machine for actuating said shaft.

17. In a voting-machine, registers for the various candidates arranged in curved rows, one row for the candidates for each office, a rod or shaft concentric with said rows, voting-levers for actuating said registers that are mounted on said rod or shaft so that each lever can be moved along a single row of register to a position for actuating the desired register in such row, and a resetting-rod movable by the voter as he is leaving the voting-machine for engaging and returning all of said levers to their unoperated position.

18. In a voting-machine, a curved casing with end pieces arranged at right angles to the top of the casing, curved rows of registers mounted within said casing, one row for the candidates for each office, a shaft mounted in the end pieces of the casing concentric with the registers in said rows, voting-levers mounted on said shaft that are movable along the registers, there being one voting-lever for each row of registers, a bar fulcrumed in each end piece substantially parallel with the voting-levers, and a resetting-rod carried by said bars at their outer ends that when moved engages the levers and returns them to normal position.

19. In a voting-machine, a curved casing with end pieces arranged at right angles to the top of the casing, curved rows of registers mounted within said casing, one row for the candidates for each office, a shaft mounted in the end pieces of the casing concentric with the registers in said rows, voting-levers mounted on said shaft that are movable along the registers, there being one voting-lever for each row of registers, a bar fulcrumed in each end piece substantially parallel with the voting-levers, a resetting-rod carried by said bars at their outer ends that when moved engages the voting-levers and returns them to normal position, and means on said shaft for actuating said bars and resetting-rod.

20. In a voting-machine, curved rows of registers, a shaft concentric therewith that is operated by the voter as he leaves the machine, voting-levers pivoted on said shaft that are movable along the rows of registers to a position opposite the register in each row desired to be operated, means operated by said shaft for causing said voting-levers to actuate the desired registers, and means operated by said shaft after the desired registers have been actuated for resetting the voting-levers.

21. In a voting-machine, a curved casing with parallel end pieces, registers therein arranged in rows, one row for each office, a shaft mounted in the end pieces concentric with said registers, levers mounted on said shaft that are movable along the registers in a row to a position opposite the register desired to be actuated, means operated by said shaft for causing the levers so positioned to actuate the desired registers, a resetting-rod extending through the machine in a position to engage the levers and move them to their unoperated position, bars pivoted at each end of the machine eccentric with reference to said shaft and carrying said resetting-rod with spring-fingers thereon, pins in said shaft that engage said spring-fingers of the resetting mechanism in the latter part of the revolution of the shaft and of such length that they will disengage said fingers when the resetting-rod has reached the end of its movement, and a spring to return said resetting-rod to its unoperated position.

22. In a voting-machine, registers arranged in a series of curved rows, there being one row for each office, a rod or shaft concentric with said registers, voting-levers mounted on said rod or shaft that are movable along the registers in the rows, there being one lever for each row of registers, and a straight-ticket lever mounted on said rod or shaft with a rod extending laterally therefrom in position to engage and move all of the voting-levers simultaneously and in line with it for the purpose of voting a straight ticket.

23. In a voting-machine, registers for the regular candidates for one office arranged in a row, a voting-lever movable along said row of registers to a position opposite the desired register to be actuated, an independent recorder in line with said row of registers, and means operated by said voting-lever when it is moved for preventing the use of the independent recorder.

24. In a voting-machine, a slotted casing, the names of the candidates for a single office arranged on said casing adjacent said slot, registers for said candidates mounted within the casing to correspond with the names of the candidates, a voting-lever movable by the voter through said slot along the row of registers to a position opposite the desired register for actuating the same, an independent recorder in line with said slot, and means operated by said voting-lever when it is moved for preventing the use of the independent recorder.

25. In a voting-machine, registers for the regular candidates for one office arranged in a row, a voting-lever movable along said row of registers to a position opposite the desired register to be actuated, an independent recorder in line with said row of registers, and means actuated by the independent recorder when used for preventing the operation of said voting-lever.

26. In a voting-machine, a slotted casing, the names of the candidates for a single office arranged on said casing adjacent said slot, registers for said candidates mounted within the casing to correspond with the names of the candidates, a voting-lever movable by the voter through said slot along the row of registers to a position opposite the desired register for actuating the same, an independent recorder in line with said slot, and means actuated by the independent recorder when used for preventing the operation of said lever.

27. In a voting-machine, a slotted casing, the names of the candidates for a single office mounted in said casing adjacent said slot, registers for said candidates mounted within the casing to correspond with the names of the candidates, a voting-lever movable by the voter through said slot along the row of registers to a position opposite the desired register for actuating the same, a sliding plate connected with said lever and movable thereby, an independent recorder substantially in line with said slot, and means that is held by said plate after said lever has been moved for preventing the use of said recorder.

28. In a voting-machine, a slotted casing, the names of the candidates for a single office mounted in said casing adjacent said slot, registers for said candidates mounted within the casing to correspond with the names of the candidates, a voting-lever movable by the voter through said slot along the row of registers to a position opposite the desired register for actuating the same, a sliding plate connected with said lever and movable thereby, an independent recorder substantially in line with said slot, and means operated by the independent recorder when used for preventing the movement of said sliding plate and the lever attached thereto.

29. In a voting-machine, a slotted casing, the names of the candidates for a single office mounted in said casing adjacent said slot, registers for said candidates mounted within the casing to correspond with the names of the candidates, a voting-lever movable by the voter through said slot along the row of registers to a position opposite the desired register for actuating the same, a sliding plate connected with said lever and actuated thereby, said sliding plate having one or more notches therein, an independent recorder mounted substantially in line with said slot having a lid to render the same accessible to the voter, and means secured on said lid and movable thereby into a notch in said plate to prevent the actuation of said plate.

30. In a voting-machine, a slotted casing, the names of the candidates for a single office mounted in said casing adjacent said slot, registers for said candidates mounted within the casing to correspond with the names of the candidates, a voting-lever movable by the voter through said slot along the row of registers to a position opposite the desired register for actuating the same, a sliding plate connected with said lever and movable thereby, an independent recorder mounted beside the path of said plate with a lid for rendering said register accessible to the voter, and means secured to said lid to engage said sliding plate when moved and prevent the lid from being opened.

31. In a voting-machine, registers for the regular candidates arranged in curved rows, a shaft concentric with said registers, voting-levers mounted on said shaft, independent recorders arranged in line with the row of registers for regular candidates for the same office, interlocking means between the means for voting for the regular and independent candidates for an office, and means operated by said shaft for resetting the independent recording mechanism.

32. In a voting-machine, registers for the regular candidates arranged in curved rows, one row for each office, a shaft concentric with said registers, voting-levers mounted on and actuated by said shaft, a sliding plate connected with said voting-levers so as to be moved when said levers are operated, an independent recorder for each office in line with the registers for the regular candidates, means connected with said independent recorder for engaging or being engaged by said sliding plate so as to interlock the regular registers and the independent recorder against each other, a rod extending beside the series of independent recorders, means actuated by said shaft for longitudinally moving said rod, and means actuated by said rod in its movement for resetting the independent recorders after they have been used.

33. A voting-machine consisting of a plurality of sections substantially semicircular in cross-section with one section located somewhat above and behind the other section and with the front lower end of the upper section resting upon the central upper portion of the lower section, and a connection between the sections whereby they may be operated together.

34. In a voting-machine, a group-voting mechanism including a curved casing with a series of curved slots therein, and a transverse slot connecting said curved slots, registers arranged within the casing corresponding to said slots, a rod or shaft concentric with said casing, and voting-levers mounted slidably on said rod or shaft and extending through the slots in the casing and beside the registers that are movable into position adjacent any register for actuating the same, the number of voting-levers equaling the number of candidates permitted to be voted for.

35. In a voting-machine, a group-voting mechanism including a curved casing with a series of curved slots therein, and a transverse slot connecting said curved slots, registers arranged within the casing corresponding to said slots, a rod or shaft concentric with said casing, voting-levers mounted slidably on said rod or shaft and extending through the slots in the casing and beside the registers that are movable into position adjacent any register for actuating the same, the number of voting-levers equaling the number of candidates permitted to be voted for, and means actuated by said rod or shaft for operating said voting-levers after they have been placed in position by the voter.

36. In a voting-machine, a group-voting mechanism including a curved casing with a series of curved slots therein, and a transverse slot connecting said curved slots, registers arranged within the casing corresponding to said slots, a rod or shaft concentric with said casing, voting-levers mounted slidably on said rod or shaft and extending through the slots in the casing and beside the registers that are movable into position adjacent any register for actuating the same, the number of voting-levers equaling the number of candidates permitted to be voted for, means actuated by said rod or shaft for operating said voting-levers after they have been placed in position by the voter, and means for returning said voting-levers to an inoperative position.

37. In a voting-machine, a group-voting mechanism including a curved casing with a series of curved slots therein, and a transverse slot connecting said curved slots, registers arranged within the casing corresponding to said slots, a rod or shaft concentric with said casing, voting-levers mounted slidably on said rod or shaft and extending through the slots in the casing and beside the registers that are movable into position adjacent any register for actuating the same, the number of voting-levers equaling the number of candidates permitted to be voted for, means actuated by said rod or shaft for operating said voting-levers after being placed in position by the voter, and means for temporarily holding said levers in the position in which they are placed.

38. In a voting-machine, a group-voting mechanism including a curved casing with a series of curved slots therein, and a transverse slot connecting said curved slots, registers arranged within the casing corresponding to said slots, a rod or shaft concentric with said casing, voting-levers mounted slidably on said rod or shaft and extending through the slots in the casing and beside the registers that are movable into position adjacent any register for actuating the same, the number of voting-levers equaling the number of candidates permitted to be voted for, means actuated by said rod or shaft for operating said voting-levers after being placed in position by the voter, and spring pins or fingers in said casing extending into the path of said voting-levers for temporarily holding the same in the position in which they are placed.

39. In a voting-machine, a group-voting mechanism including a curved casing with a series of curved slots therein and a transverse slot connecting said curved slots, registers arranged within the casing corresponding to said slots, a rod or shaft concentric with said casing, and voting-levers mounted slidably on said rod or shaft and extending through the slots in the casing and beside the registers that are movable into position adjacent any register for actuating the same, the number of voting-levers equaling the number of candidates permitted to be voted for, and said levers having an offset between their ends, the length of the offset being graduated in the series so that the plurality of them may be operated in one vertical slot.

In witness whereof I have hereunto affixed my signature in the presence of the witnesses herein named.

FRED R. TAISEY.

Witnesses:
GRACE MURPHY,
NELLIE ALLEMONG.